(12) United States Patent
Honjo et al.

(10) Patent No.: US 7,622,092 B2
(45) Date of Patent: Nov. 24, 2009

(54) METHOD AND DEVICE FOR REMOVING MERCURY

(75) Inventors: Shintaro Honjo, Hiroshima (JP);
Susumu Okino, Hiroshima (JP);
Yasuhiro Takeuchi, Hiroshima (JP);
Seiji Kagawa, Hiroshima (JP); Yoshio Nakayama, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 107 days.

(21) Appl. No.: 11/798,365

(22) Filed: May 14, 2007

(65) Prior Publication Data
US 2008/0138264 A1    Jun. 12, 2008

(30) Foreign Application Priority Data
Dec. 7, 2006    (JP) .............................. 2006-330951

(51) Int. Cl.
*B01D 53/50* (2006.01)
*B01D 53/56* (2006.01)
*B01D 53/64* (2006.01)
*B01D 53/74* (2006.01)
*B01D 53/75* (2006.01)
*B01D 53/76* (2006.01)

(52) U.S. Cl. ............... 423/210; 423/239.1; 423/243.08; 423/DIG. 5; 422/105; 422/108; 422/111; 422/168; 422/169; 422/170; 422/171; 422/177; 422/180

(58) Field of Classification Search ............... 423/210, 423/239.1, 243.08, DIG. 5; 422/105, 108, 422/111, 168–171, 177, 180
See application file for complete search history.

(56) References Cited

U.S. PATENT DOCUMENTS

| | | | | |
|---|---|---|---|---|
| 6,447,740 | B1 * | 9/2002 | Caldwell et al. | 423/210 |
| 6,638,485 | B1 * | 10/2003 | Iida et al. | 423/210 |
| 6,913,737 | B2 * | 7/2005 | Honjo et al. | 423/210 |
| 6,960,329 | B2 * | 11/2005 | Sellakumar | 423/210 |
| 2002/0068030 | A1 * | 6/2002 | Nolan et al. | 423/210 |
| 2003/0170159 | A1 | 9/2003 | Honjo et al. | |
| 2003/0235525 | A1 * | 12/2003 | Honjo et al. | 423/210 |
| 2004/0202596 | A1 | 10/2004 | Honjo et al. | |

(Continued)

FOREIGN PATENT DOCUMENTS
DE    4218672 C1    8/1993

(Continued)

OTHER PUBLICATIONS

European Search Report dated May 19, 2008, issued in corresponding European Patent Application No. 07108037.8.

(Continued)

*Primary Examiner*—Timothy C Vanoy
(74) *Attorney, Agent, or Firm*—Westerman, Hattori, Daniels & Adrian, LLP

(57) ABSTRACT

A mercury removing device includes a gasification unit that converts a non-gaseous-mercury-chlorinating agent, which is non-gaseous at room temperature and normal pressure, into gaseous-mercury-chlorinating agent by heating the non-gaseous-mercury-chlorinating agent with heat of hot air generated by using the exhaust gas or hot air generated by using an air heater installed in a flue that conveys the exhaust gas. The gaseous-mercury-chlorinating agent produced in this manner is supplied to the exhaust gas in the flue.

10 Claims, 4 Drawing Sheets

U.S. PATENT DOCUMENTS

| | | |
|---|---|---|
| 2004/0223896 A1 | 11/2004 | Cooper et al. |
| 2005/0112042 A1 | 5/2005 | Honjo et al. |
| 2006/0029532 A1* | 2/2006 | Breen et al. .......... 423/210 |
| 2007/0202020 A1 | 8/2007 | Honjo et al. |

FOREIGN PATENT DOCUMENTS

| | | |
|---|---|---|
| EP | 0 860 197 A1 | 8/1998 |
| EP | 1 316 352 A1 | 6/2003 |
| EP | 1 800 734 A1 | 6/2007 |
| JP | 07-016431 A | 1/1995 |
| JP | 10-230137 A | 9/1998 |
| JP | 2001-198434 A | 7/2001 |
| JP | 2004-313833 A | 11/2004 |
| JP | 2005-519732 A | 7/2005 |
| JP | 2007-167743 A | 7/2007 |
| WO | WO 03/076051 A1 | 9/2003 |
| WO | WO 2006/093026 A1 | 9/2006 |

OTHER PUBLICATIONS

Office Action mailed Nov. 18, 2008 in Corresponding Japanese Patent Application No. 2006-330951.

EP Search Report for EP 1 800 734 dated Mar. 29, 2007.

* cited by examiner

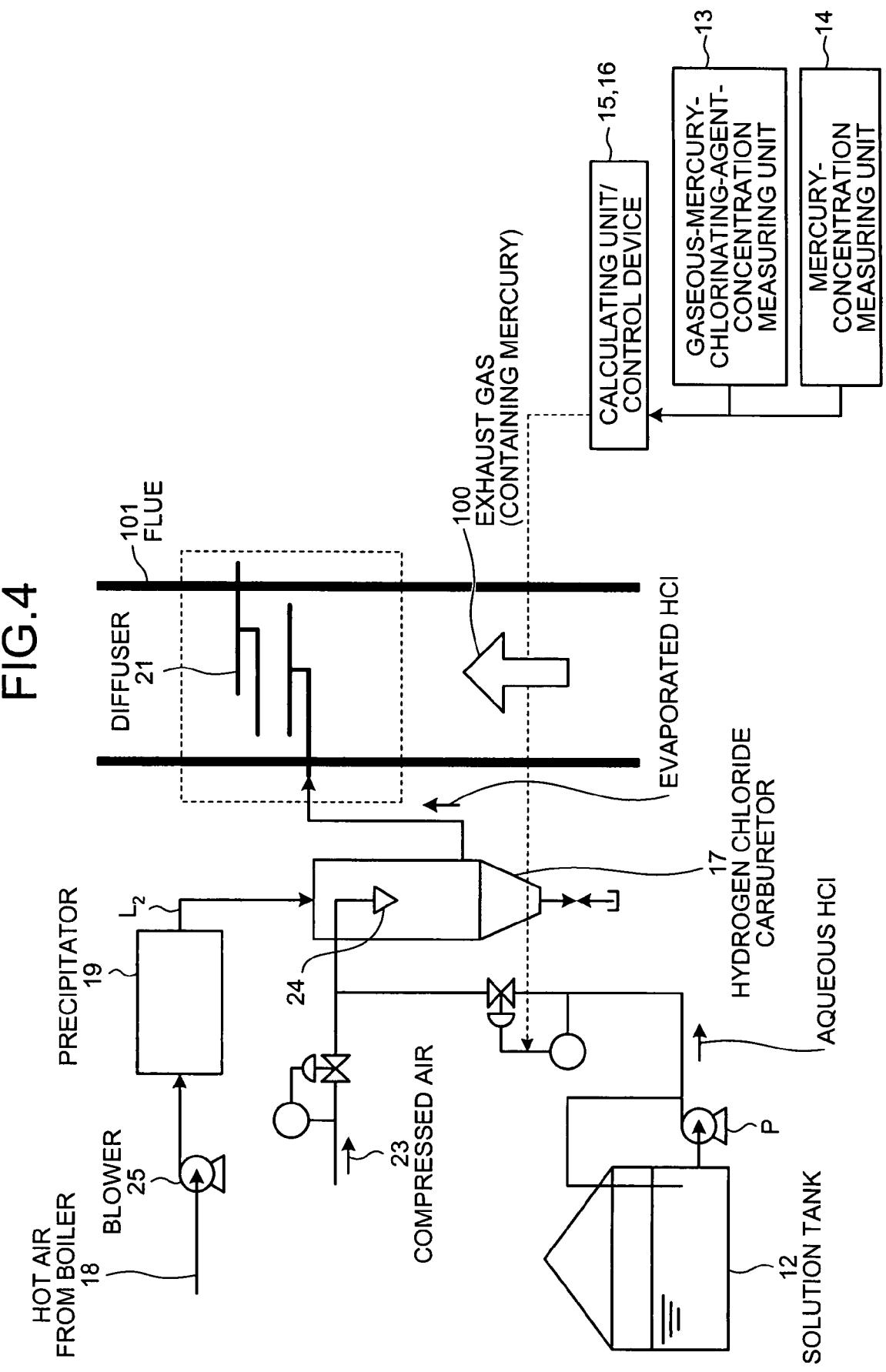

METHOD AND DEVICE FOR REMOVING MERCURY

BACKGROUND OF THE INVENTION

1. Field of the Invention

The present invention relates to a technology for removing mercury contained in an exhaust gas.

2. Description of the Related Art

Exhaust gas generated by combusting coal or heavy oil may contain harmful or toxic material such as soot, sulfur oxide ($SO_x$), nitrogen oxide ($NO_x$), and metal mercury.

Recently, various techniques have been devised for treating metal mercury in combination with denitration equipment that reduce $NO_x$ and wet desulfurization equipment that use alkali absorbing solution as an $SO_x$ absorbent.

As a method of treating metal mercury in the exhaust gas, a method of using a sorbent is widely known. The sorbent can be an activated carbon or a selenium filter. However, because this method requires sorbent injection devices and larger-scale sorbent collectors, or a special type of absorption removal means, it is costly and not suitable for the treatment of large amount of exhaust gas such as those exhausted from power plants.

To solve these issues, Japanese Patent Application Laid-Open No. H10-230137 discloses a method in which a chlorinating agent is gas-atomized on the upstream side of a denitration equipment at a hot temperature in a flue, mercury is oxidized (chlorinated) on a denitration catalyst to prepare soluble mercury chloride, and the mercury chloride is absorbed in a wet desulfurization equipment installed on the downstream.

A device and a technology for gas atomization in a flue are put into practice by an ammonia ($NH_3$) atomizer in a denitration equipment, and the same scheme can be applicable to gas atomization of a chlorinating agent. However, because hydrochloric gas is highly corrosive, if the chlorinating agent is added in surplus, it causes corrosion of the flue or a downstream device in the system, and therefore, there is a problem that the life of the plant is shortened.

To solve this problem, Japanese Patent Application Laid-Open No. 2001-198434 discloses a system in which a mercury concentration is measured of the exhaust gas obtained after a wet desulfurization is performed, and the amount of the chlorinating agent is adjusted based on the mercury concentration after the desulfurization is performed.

Adjustment of the amount of the chlorinating agent is relatively easy if highly-pure hydrochloric gas is directly used as the chlorinating agent. However, it is costly and not economical for the treatment of large amount of exhaust gas.

Furthermore, regarding spraying a chlorinating agent, there have been few materials that can be directly sprayed at an operating temperature of the denitration equipment (in a range between 350° C. and 420° C.). If neutral salt slurry such as sodium chloride (NaCl) is used, because it not decompose at the operating temperature of the denitration equipment, a desired effect cannot be obtained, possibly causing clogging.

SUMMARY OF THE INVENTION

It is an object of the present invention to at least partially solve the problems in the conventional technology.

According to an aspect of the present invention, a method of removing mercury from exhaust gas that contains one or more of nitrogen oxide, sulfur oxide, and mercury includes converting a non-gaseous-mercury-chlorinating agent, which is non-gaseous at room temperature and normal pressure, into gaseous-mercury-chlorinating agent by heating the non-gaseous-mercury-chlorinating agent with heat of hot air generated by using the exhaust gas or hot air generated by using an air heater installed in a flue that conveys the exhaust gas; supplying the gaseous-mercury-chlorinating agent to the exhaust gas in the flue thereby obtaining agent-added exhaust gas; performing selective catalytic reduction on the agent-added exhaust gas by using a solid catalyst thereby obtaining denitrated exhaust gas; and performing wet desulfurization on the denitrated exhaust gas by using an alkali absorbing solution thereby obtaining desulfurized exhaust gas.

According to another aspect of the present invention, a mercury removing device that removes mercury from exhaust gas that contains one or more of nitrogen oxide, sulfur oxide includes a gasification unit that converts a non-gaseous-mercury-chlorinating agent, which is non-gaseous at room temperature and normal pressure, into gaseous-mercury-chlorinating agent by heating the non-gaseous-mercury-chlorinating agent with heat of hot air generated by using the exhaust gas or hot air generated by using an air heater installed in a flue that conveys the exhaust gas; a mercury-chlorinating-agent supply unit that supplies the gaseous-mercury-chlorinating agent to the exhaust gas in the flue thereby obtaining agent-added exhaust gas; a selective catalytic reducer that performs selective catalytic reduction on the agent-added exhaust gas by using a solid catalyst thereby obtaining denitrated exhaust gas; and a desulfurization unit that performs wet desulfurization on the denitrated exhaust gas by using an alkali absorbing solution thereby obtaining desulfurized exhaust gas.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a schematic of a mercury-chlorinating-agent supply unit in the mercury removing device according to the second embodiment.

DETAILED DESCRIPTION OF THE PREFERRED EMBODIMENTS

Exemplary embodiments of the present invention are explained below in detail with reference to the accompanying drawings. The present invention is not limited to these embodiments. Constituent elements in the embodiments contain those that can easily be thought of by persons skilled in the art or those substantially equivalent thereto.

Figure 1:
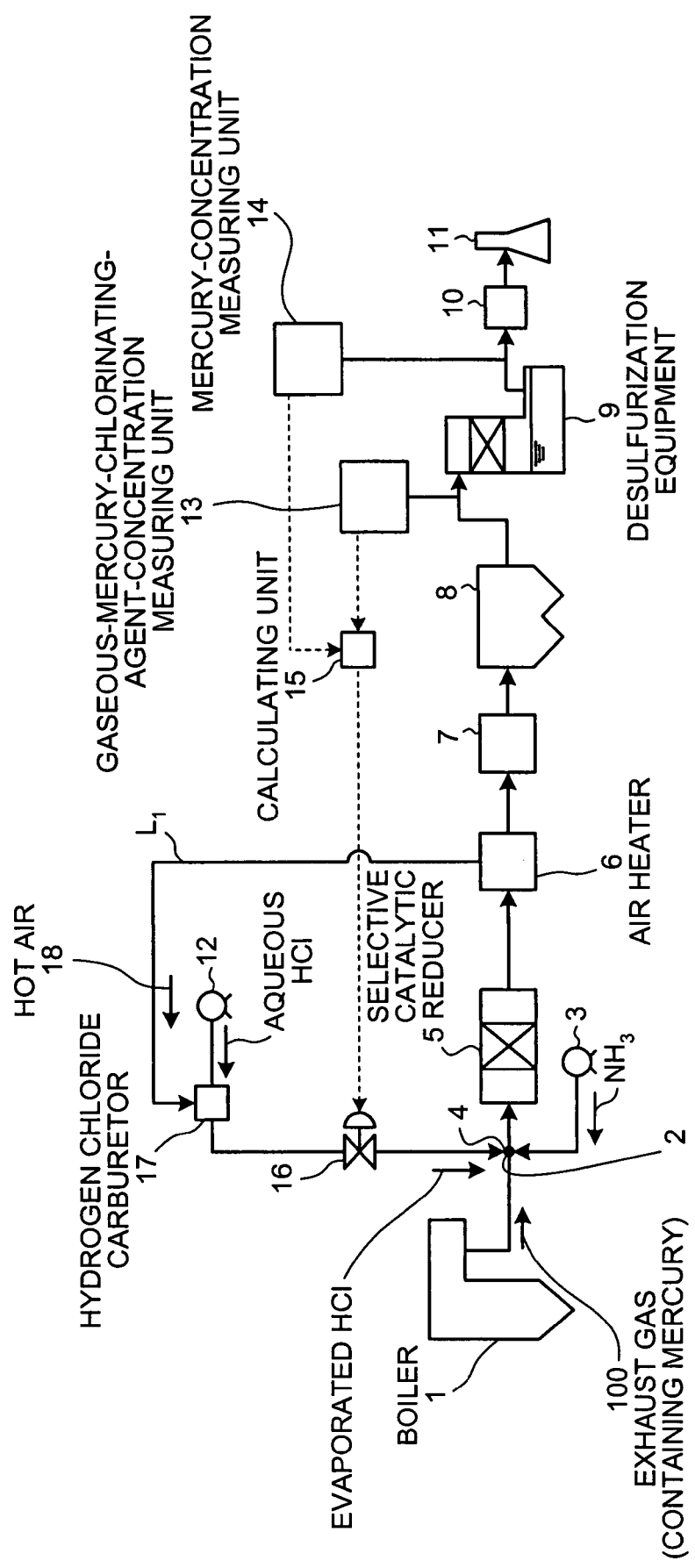
FIG. 1 is a schematic of a mercury removing device in an exhaust-gas treatment system according to a first embodiment of the present invention.

FIG. 1 is a schematic for explaining a mercury removing device from mercury-containing exhaust gas according to the first embodiment. In the first embodiment, HCl is used as a non-gaseous mercury-chlorinating agent that is non-gaseous at a room temperature and a normal pressure.

As shown in FIG. 1, the mercury removing device from a mercury-containing exhaust gas according to the first embodiment includes a hydrogen chloride carburetor 17 that supplies evaporated HCl that has been evaporated by being directly heated by a hot air 18, a selective catalytic reducer 5 that injects/supplies the evaporated HCl at an injection point 4 provided on a flue to an exhaust gas 100, which contains nitrogen oxide, sulfur oxide, and mercury, and that is exhausted from a boiler 1, and that removes the nitrogen oxide from the exhaust gas 100 to which the evaporated HCl has been supplied, an air heater 6 that heats the exhaust gas 100 from which nitrogen oxide has been removed, a heat recovering member 7 that recovers heat from the heated exhaust gas by hear exchange, a precipitator 8 that removes soot and dust from the exhaust gas 100, a desulfurization equipment 9 that removes the sulfur oxide from the exhaust gas 100, a reheater 10 that raises the temperature of the exhaust gas 100, and a flue gas stack 11 that exhausts the treated exhaust gas 100 to the outside. An injection point 2 is provided on a flue for injecting ammonia ($NH_3$) on the upstream side of the selective catalytic reducer 5 to reduce the nitrogen oxide by using $NH_3$ supplied from an $NH_3$ tank 3.

In the first embodiment, the hot air 18 from the air heater 6 is supplied to the hydrogen chloride carburetor 17 via a hot air line $L_1$. Moreover, hydrochloric acid HCl supplied from a solution tank 12 is directly heated in the hydrogen chloride carburetor 17 by using the hot air 18 to gasify the hydrochloric acid. Finally, the gaseous HCl is supplied from the injection point 4 to an inside of an exhaust-gas flue.

As described above, because the hot air 18 from the air heater 6 is used in the present invention, it is possible to increase thermal efficiency compared to a case where an indirect heat exchanger is used that employs steam.

In other words, because the hot air 18 can be used, direct heat exchange can be performed in the hydrogen chloride carburetor 17 so that the heating source can directly be used for vaporization. Accordingly, heat exchange loss in indirect heat exchange can hardly occurs, and thermal efficiency can substantially be improved.

In this manner, according to the mercury removing device of the first embodiment, it is possible to use the mercury removing device even in a plant in which steam is not available. Furthermore, a heat-exchange equipment or the like that employs extra-hot steam, such as a heat exchanger, a carbon carburetor, a blower, or the like, are not required, so that it is possible to reduce the cost for building the plant.

Moreover, because the hot air 18 can assuredly be supplied from the air heater 6 when the plant is in operation, no maintenance is required.

Furthermore, since the hot air 18 is produced in the air heater 6, it has low concentration of corrosion components in a soot concentration as compared to an exhaust gas produced in a boiler. Accordingly, it is possible to stably use the heated gas for a longer time. Furthermore, an installation including a dust collector (i.e., a cyclone, a ceramic filter, or the like) that removes soot and dust can be omitted as appropriate.

It is possible for the mercury removing device according to the present invention to include a gaseous-mercury-chlorinating-agent-concentration measuring unit 13 for the gaseous-mercury-chlorinating agent on the upstream side of the desulfurization equipment 9 in the flue, a calculating unit 15 that calculates an initial concentration of the gaseous-mercury-chlorinating agent to be supplied to a mercury-chlorinating-agent supply unit, based on the measured concentration of the gaseous-mercury-chlorinating agent, and a control device 16 that controls an amount of the non-gaseous mercury-chlorinating agent to be supplied from a non-gaseous-mercury-chlorinating-agent tank to an inside of the flue.

The gaseous/non-gaseous mercury-chlorinating-agents are explained later.

The gaseous-mercury-chlorinating-agent-concentration measuring unit 13 can be installed at any position on the upstream side of the desulfurization equipment 9 and on the downstream side of the injection point 2 for the mercury-chlorinating agent, because almost the entirety of the gaseous-mercury-chlorinating agent is collected in the desulfurization equipment 9. However, if a thin pipe is used in the gaseous-mercury-chlorinating-agent-concentration measuring unit 13 for sampling an exhaust gas, because such pipes are easily clogged by soot or the like, it is preferable to install the gaseous-mercury-chlorinating-agent-concentration measuring unit 13 on the downstream side of the precipitator 8 and the upstream side of the desulfurization equipment 9.

It is preferable for the mercury removing device according to the present invention to include a mercury-concentration measuring unit 14 installed on either the upstream side or the downstream side of the desulfurization equipment 9, the calculating unit 15 that calculates an initial concentration of the gaseous-mercury-chlorinating agent (evaporated HCl) to be supplied from the hydrogen chloride carburetor 17, and the control device 16 that controls the amount of evaporated HCl to be supplied to the flue.

An installation position of the mercury-concentration measuring unit 14 differs based on whether (I) a concentration measuring device that separately determines each quantity of metal mercury ($Hg^0$) and mercury ion ($Hg^{2+}$) is used, or (II) a concentration measuring device that determines total mercury (Hg) is used.

In this document, the term $Hg^0$ has been used to mean evaporated metal mercury.

When the device (I) is employed, the mercury-concentration measuring unit 14 can be installed at any position on the downstream side of the selective catalytic reducer 5. However, it is preferable to install the mercury-concentration measuring unit 14 on the upstream side from an inlet of the desulfurization equipment 9 because a concentration is affected by a collection efficiency of a desulfurization treatment at an outlet of the desulfurization equipment 9. Furthermore, it is more preferable to install the mercury-concentration measuring unit 14 on the outlet side of the selective catalytic reducer 5, where a collection efficiency of the precipitator can be excluded.

When the device (II) is employed, the mercury-concentration measuring unit 14 is installed at the outlet side of the desulfurization equipment 9 because mercury is not detected at the inlet of the desulfurization equipment 9 even when a composition ratio is changed because of a change of the oxidation ratio when any components were not collected in the precipitator 8.

A mercury concentration inside the flue of an exhaust gas that has been emitted from a boiler is generally in a range between 0.1 $\mu g/m^3 N$ and 50 $\mu g/m^3 N$.

As will be explained below, the initial concentration of the gaseous-mercury-chlorinating agent can be calculated and controlled based on a measurement by a gaseous-mercury-chlorinating-agent-concentration measuring device and a mercury-concentration measuring device.

A supply amount of the non-gaseous mercury-chlorinating agent is controlled so that an HCl concentration and a chlorine ($Cl_2$) concentration in a predetermined hydrochloric gas or a predetermined chlorine gas in a denitration equipment is to be those necessary for $Hg^0$ oxidation performance.

When the device (I) is employed, a relation between a catalytic oxidation ratio and a concentration of each of the components is determined by the following. If the oxidation ratio is lowered from any one of measurements, an increase of $Hg^0$ concentration or a decrease of $Hg^{2+}$ concentration is detected and a control is performed to increase an atomization amount of the mercury-chlorinating agent to obtain a predetermined oxidation ratio.

$$C_{Hg^0 out} = C_{Hg^0 in}(1 - n_{Hg^0 ox.})$$

$$C_{Hg^{2+} out} = C_{Hg^{2+} in} + C_{Hg^0 in} n_{Hg^0 ox.}$$

where
$C_{Hg^0 in}$: $Hg^0$ concentration at catalyst inlet [µg/m³N]
$C_{Hg^0 out}$: $Hg^0$ concentration at catalyst outlet [µg/m³N]
$C_{Hg^{2+} in}$: $Hg^{2+}$ concentration at catalyst inlet [µg/m³N]
$C_{Hg^{2+} out}$: $Hg^{2+}$ concentration at catalyst outlet [µg/m³N]
$n_{Hg^0 ox.}$: $Hg^0$ oxidation ratio of catalyst [-]

When the device (II) is employed, if $Hg^{2+}$ is collected at a predetermined collection efficiency and $Hg^0$ is not collected, a relationship between a catalytic oxidation ratio of mercury and a concentration of total Hg at the outlet of the denitration equipment is determined by the following. If the catalytic oxidation ratio decreases, an increase of the total Hg concentration is detected and a control is performed to increase an atomization amount of the mercury-chlorinating agent to obtain a predetermined oxidation ratio.

$$\begin{aligned} C_{T-Hgabs.out} &= C_{Hg^0 out} + C_{Hg^{2+} out.}(1 - n_{Hg^{2+} abs}) \\ &= C_{Hg^0 in}(1 - n_{Hg^0 ox.}) + (C_{Hg^{2+} in} + C_{Hg^0 in} n_{Hg^0 ox.})(1 - n_{Hg^{2+} abs.}) \\ &= C_{Hg^0 in}(1 - n_{Hg^0 ox.} \cdot n_{Hg^{2+} abs.}) + C_{Hg^{2+} in}(1 - n_{Hg^{2+} abs.}) \end{aligned}$$

where
$C_{T-Hgabs.out}$: Total Hg concentration at outlet of denitration [µg/m³N]
$n_{Hg^{2+} abs.}$: $Hg^{2+}$ collection ratio in denitration unit [-]

Although it is known about mercury collection performance in the desulfurization equipment 9, with which absorbed $Hg^{2+}$ is reduced to $Hg^0$ by an action of sulfite ion in an absorption tower and $Hg^0$ is re-emitted from the absorption tower, it can be suppressed by controlling oxidation reduction potential of absorbing solution, as disclosed in, for example, Japanese Patent Application Laid-Open No. 2004-313833.

A control of hydrogen chloride or chlorine gas performed by the concentration measuring device or the mercury-concentration measuring device can be performed separately. Alternatively, a method of combining them to perform a cascade control (one is determined as a primary control parameter while the other is determined as a secondary parameter) can also be acceptable.

An atomization is performed so that an initial concentration of HCl in the flue is in a range between 1 ppm and 500 ppm, or more preferably, between 10 ppm and 100 ppm. For $Cl_2$, an atomization is performed so that the same is in a range between 0.1 ppm and 100 ppm, or preferably, between 1 ppm to 10 ppm. If the concentration is higher, the cost increases and economic efficiency is reduced.

A ratio of a molar concentration of the mercury-chlorinating agent (in the specification, it is also described as an initial concentration of hydrogen chloride or chlorine gas) to be supplied to an exhaust gas to an Hg molar concentration when hydrochloric gas and monovalent chloride compound such as ammonium chloride ($NH_4Cl$) powder are used, that is, Hg molar concentration/molar concentration of hydrogen chloride or chlorine gas, is preferably equal to or smaller than 0.001, and more preferably, equal to or smaller than 0.0001. From an economical point of view, it is possible to determine a preferable lower limit of an Hg molar concentration to an initial concentration of hydrochloric gas to be equal to or larger than 0.00001 as long as it is within the above range. For chlorine gas, the ratio is preferably equal to or smaller than 0.01, or more preferably, equal to or smaller than 0.001. From an economical point of view, it is still possible to determine a preferable lower limit of an Hg molar concentration to an initial concentration of chlorine gas to be equal to or larger than 0.0001 as long as it is within the above range.

The mercury removing device according to the present invention includes a heating device that heats the non-gaseous-mercury-chlorinating agent that is non-gaseous at a room temperature and a normal pressure, or a gasification device that obtains a gaseous-mercury-chlorinating agent from the non-gaseous-mercury-chlorinating agent.

The term room temperature means a temperature of about 25° C. and the term normal pressure means a pressure of about 1 atmosphere (atm).

The non-gaseous-mercury-chlorinating agent is a solid chlorination product, a solid compound capable of generating chlorination product, a chlorination product in which a chlorination product is dissolved in a solvent under such a condition that a vapor pressure of the chlorination product is equal to or lower than 0.1 MPa, and a liquefied chlorine. As the non-gaseous chlorination product, an ammonium chloride ($NH_4Cl$) powder, ammonium hypochlorite, a solid chlorination product such as ammonium chloride, aqueous hydrogen chloride (HCl aqueous solution), and a chlorination product dissolved in a solvent such as chlorite solution or perchlorate solution can be used.

The heating device and the gasification device are installed, as shown in FIG. 1, on the upstream side of the selective catalytic reducer 5 and connected to the injection point 4 for the mercury-chlorinating agent. The mercury-chlorinating agent injected from the injection point 4 reacts with mercury in an exhaust gas in the selective catalytic reducer 5 and mercury chloride ($HgCl_2$) is prepared.

The mercury removing device according to the present invention uses a less-expensive gaseous-mercury-chlorinating agent, instead of using highly-pure hydrochloric gas, thereby reducing the operating cost.

Figure 2:
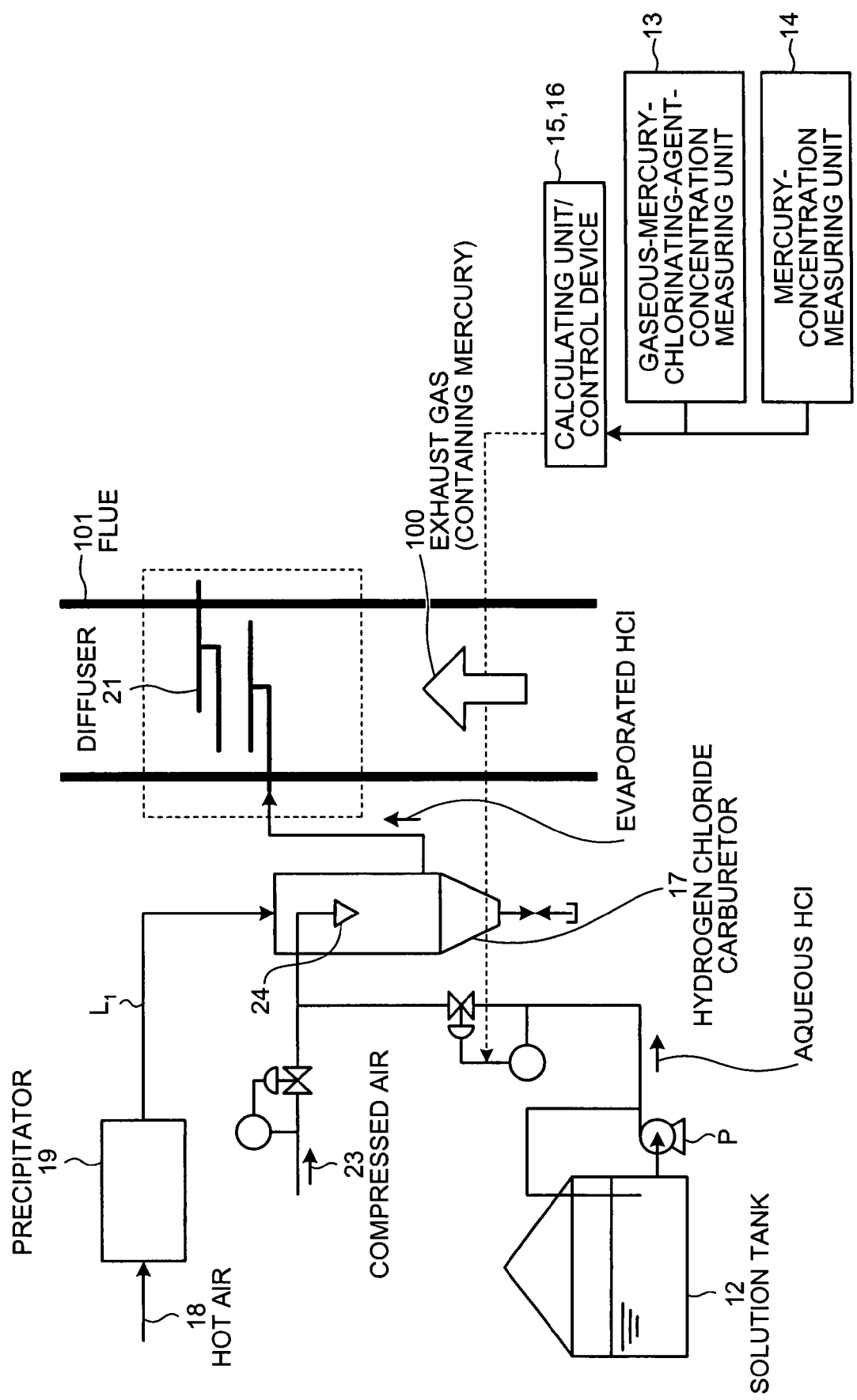
FIG. 2 is a schematic of a mercury-chlorinating-agent supply unit in the mercury removing device according to the first embodiment.

FIG. 2 is a schematic of a mercury-chlorinating-agent supply unit in the mercury removing device according to the first embodiment of the present invention.

As shown in FIG. 2, HCl aqueous solution that is stored at the room temperature in the solution tank 12 is supplied to the hydrogen chloride carburetor 17 by using a solution supply pump P. The HCl aqueous solution is then sprayed and evaporated by using a compressed air 23, which is heated to a predetermined temperature and is supplied from the gasification device such as an atomization-air compressor (not shown), and finally sprayed from a spray nozzle 24. The predetermined temperature of the compressed air 23 is generally in a range between 50° C. and 60° C.

The sprayed and evaporated hydrogen chloride is directly heated by the hot air 18 and diffused from a diffuser 21 in a flue 101.

In other words, it is possible to adjust a mixed gas that contains hydrogen chloride, aqueous, and air to a predetermined concentration by directly heating by the hot air 18. The mixed gas that contains hydrogen chloride, aqueous, and air is diffused by the diffuser 21 equivalent to that for atomizing $NH_3$ into the flue 101, and atomized equally in the exhaust gas 100 that contains mercury.

Figure 3:
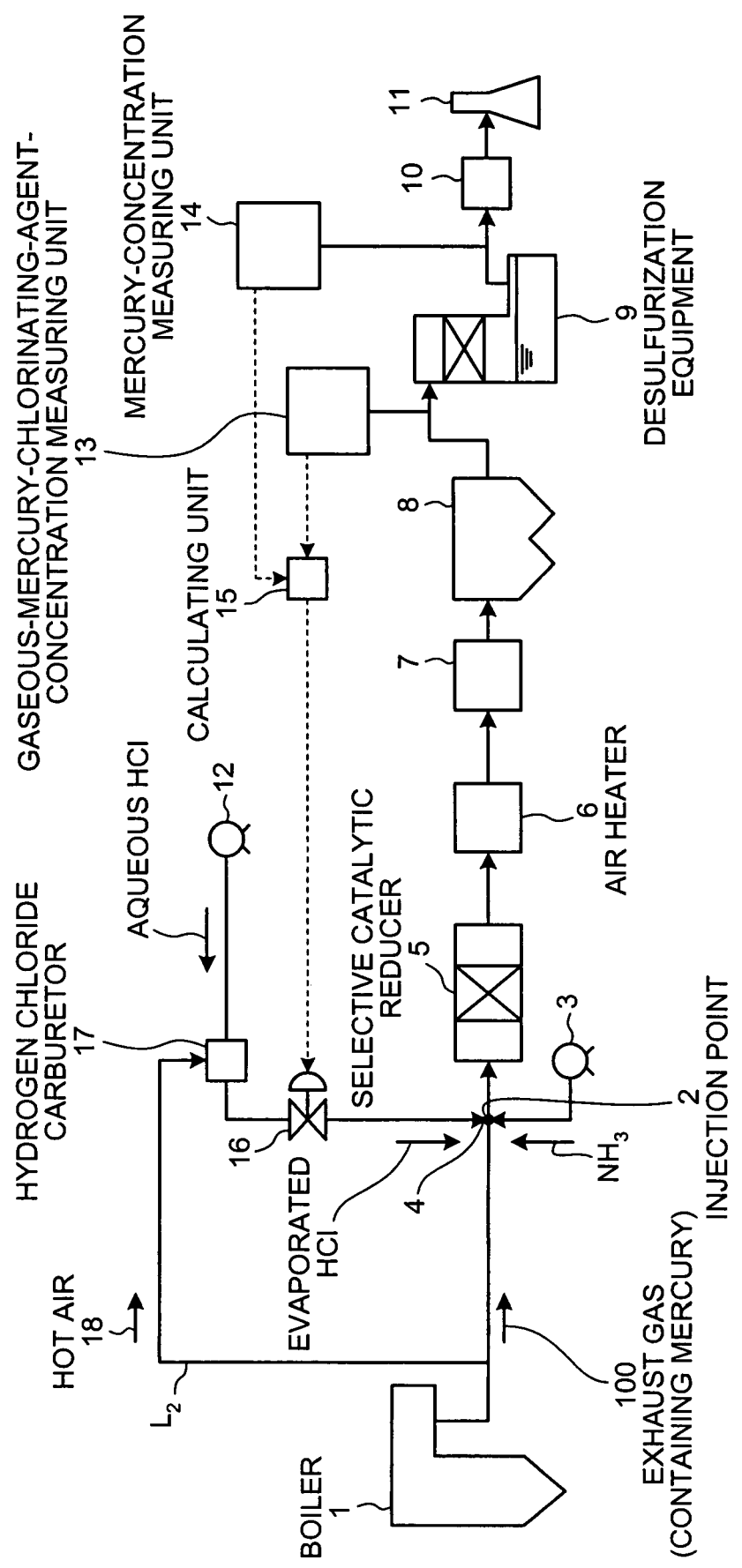
FIG. 3 is a schematic of a mercury removing device in an exhaust-gas treatment system according to a second embodiment of the present invention.

FIG. 3 is a schematic of a mercury removing device from a mercury-containing exhaust gas according to a second embodiment of the present invention.

As shown in FIG. 3, the mercury removing device from a mercury-containing exhaust gas according to the second embodiment includes the hydrogen chloride carburetor 17 that supplies evaporated HCl as the mercury-chlorinating agent to the exhaust gas 100, which contains nitrogen oxide, sulfur oxide, and mercury, and that is exhausted from the boiler 1, the selective catalytic reducer 5 that removes nitrogen oxide from the exhaust gas 100 to which the evaporated HCl is supplied, the air heater 6 and the heat recovering member 7 that heat the exhaust gas 100 from which nitrogen oxide has been removed, the precipitator 8 that removes soot and dust from the exhaust gas 100, the desulfurization equipment 9 that removes sulfur oxide from the exhaust gas 100, the reheater 10 that raises a temperature of the exhaust gas 100, and the flue gas stack 11 that emits the treated exhaust gas 100 to the outside.

According to the second embodiment, a portion of the exhaust gas 100 is extracted from the boiler 1 and supplied to the hydrogen chloride carburetor 17 via a second hot air line $L_2$. Thereafter, hydrochloric acid HCl supplied from the solution tank 12 is directly heated by the hot air 18 supplied from the hydrogen chloride carburetor 17, and is gasified.

As described above, according to the second embodiment of the present invention, a portion of the exhaust gas 100 extracted from the boiler 1 is used as the hot air 18. Accordingly, it is possible to improve thermal efficiency compared to an indirect heat exchanger that uses steam.

Because the exhaust gas 100 from the boiler 1 contains soot, a precipitator 19 is provided in the second hot air line $L_2$.

FIG. 4 is a schematic of a mercury-chlorinating-agent supply unit in the mercury removing device according to the second embodiment of the present invention.

As shown in FIG. 4, HCl aqueous solution that is stored at the room temperature in the solution tank 12 is supplied to the hydrogen chloride carburetor 17 by the solution supply pump P. The HCl aqueous solution is then sprayed and evaporated by using the compressed air 23, which is heated to a predetermined temperature and is supplied from the gasification device such as an atomization-air compressor (not shown), and finally sprayed from the spray nozzle 24. The predetermined temperature of the compressed air 23 is generally in a range between 50° C. and 60° C.

The sprayed and evaporated hydrogen chloride is directly heated by the hot air 18 from a portion of a boiler exhaust gas supplied from the second hot air line $L_2$, and diffused from the diffuser 21 in the flue 101.

In other words, it is possible to adjust a mixed gas that contains hydrogen chloride, aqueous, and air, to a predetermined concentration by directly heating by the hot air 18 from a portion of the boiler exhaust gas. The mixed gas that contains hydrogen chloride, aqueous, and air is diffused by the diffuser 21 equivalent to that for spraying $NH_3$ into the flue 101, and atomized equally in the exhaust gas 100 that contains mercury.

It is acceptable to use a dedicated exhaust gas instead of using a portion of the exhaust gas 100 from the boiler 1. The dedicated exhaust gas can be housed in a separately installed single combustion furnace. If a fuel that does not generates soot or dust is used, then the precipitator 19 can be omitted.

Accordingly, it is possible to prevent a control variation caused by extracting a portion of the exhaust gas 100 upon performing a boiler control. Specifically, when there is an existing boiler control, and if a mercury treatment device is additionally installed, it is possible to remove mercury without changing the boiler control.

The mercury removing device according to the present invention can be applied to treatment of an exhaust gas emitted from equipment that burns fossil fuel such as a coal or a heavy oil that contains mercury, in a thermal power plant or the like.

According to the present invention, it is possible to directly heat a non-gaseous-mercury-chlorinating agent without using steam as a heat source and to realize an exhaust-gas treatment system with improved thermal efficiency, long-term reliability, and lower operating cost.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of removing mercury from exhaust gas that contains nitrogen oxide, sulfur oxide, and mercury, the method comprising:
    converting a non-gaseous-mercury-chlorinating agent, which is non-gaseous at room temperature and normal pressure, into gaseous-mercury-chlorinating agent by heating the non-gaseous-mercury-chlorinating agent with heat of hot air generated by using the exhaust gas or hot air generated by using an air heater installed in a flue that conveys the exhaust gas;
    supplying the gaseous-mercury-chlorinating agent to the exhaust gas in the flue thereby obtaining agent-added exhaust gas;
    performing selective catalytic reduction on the agent-added exhaust gas by using a solid catalyst thereby obtaining denitrated exhaust gas; and
    performing wet desulfurization on the denitrated exhaust gas by using an alkali absorbing solution thereby obtaining desulfurized exhaust gas.

2. The method according to claim 1, further comprising removing soot from the hot air before using the hot air at the converting.

3. The method according to claim 1, wherein a temperature of the hot air is in a range between about 300° C. and about 400° C.

4. The method according to claim 1, further comprising:
    measuring a concentration of gaseous-mercury-chlorinating agent in the desulfurized exhaust gas;
    calculating an initial concentration of gaseous-mercury-chlorinating agent to be supplied to the exhaust gas at the supplying based on the concentration measured at the measuring; and
    controlling an amount of the non-gaseous-mercury-chlorinating agent to be used at the converting for producing the gaseous-mercury-chlorinating agent based on the initial concentration calculated at the calculating.

5. The method according to claim 1, wherein the non-gaseous-mercury-chlorinating agent is any one of ammonium chloride, aqueous hydrogen chloride, and liquefied chlorine.

6. A mercury removing device that removes mercury from exhaust gas that contains nitrogen oxide, sulfur oxide, the mercury removing device comprising:
    a gasification unit that converts a non-gaseous-mercury-chlorinating agent, which is non-gaseous at room temperature and normal pressure, into gaseous-mercury-chlorinating agent by heating the non-gaseous-mercury-chlorinating agent with heat of hot air generated by using the exhaust gas or hot air generated by using an air heater installed in a flue that conveys the exhaust gas;

a mercury-chlorinating-agent supply unit that supplies the gaseous-mercury-chlorinating agent to the exhaust gas in the flue thereby obtaining agent-added exhaust gas;

a selective catalytic reducer that performs selective catalytic reduction on the agent-added exhaust gas by using a solid catalyst thereby obtaining denitrated exhaust gas; and a desulfurization unit that performs wet desulfurization on the denitrated exhaust gas by using an alkali absorbing solution thereby obtaining desulfurized exhaust gas.

7. The mercury removing device according to claim 6, wherein a temperature of the hot air is in a range between about 300° C. and about 400° C.

8. The mercury removing device according to claim 6, further comprising:

a concentration measuring unit that measures a concentration of gaseous-mercury-chlorinating agent in the desulfurized exhaust gas;

a calculating unit that calculates an initial concentration of the gaseous-mercury-chlorinating-agent to be supplied to the mercury-chlorinating-agent supply unit based on the concentration measured by the concentration measuring unit; and a control unit that controls an amount of the non-gaseous-mercury-chlorinating agent to be supplied to the gasification unit for producing the gaseous-mercury-chlorinating agent based on the initial concentration calculated by the calculating unit.

9. The mercury removing device according to claim 6, wherein the non-gaseous -mercury-chlorinating agent is any one of ammonium chloride, aqueous hydrogen chloride, and liquefied chlorine.

10. The mercury removing device according to claim 6, further comprising:

a mercury-concentration measuring unit that measures a concentration of mercury in at least one of the denitrated exhaust gas and the desulfurized exhaust gas;

a second calculating unit that calculates an initial concentration of the gaseous-mercury-chlorinating-agent to be supplied to the mercury-chlorinating-agent supply unit based on the concentration measured by the mercury-concentration measuring unit; and a second control unit that controls an amount of the non-gaseous-mercury-chlorinating agent to be supplied to the gasification unit for producing the gaseous-mercury-chlorinating agent based on the initial concentration calculated by the second calculating unit.

* * * * *